United States Patent [19]

Schulze et al.

[11] Patent Number: 5,270,293
[45] Date of Patent: Dec. 14, 1993

[54] MOLTEN SALT SYNTHESIS OF ANISOTROPIC POWDERS

[75] Inventors: Walter A. Schulze, Alfred Station; Sudhakar Gopalakrishnan, Alfred Allegany County, both of N.Y.

[73] Assignee: Alfred University, Alfred, N.Y.

[21] Appl. No.: 684,309

[22] Filed: Apr. 12, 1991

[51] Int. Cl.$^5$ .................. C01F 11/02; C01F 17/00; C01G 3/02

[52] U.S. Cl. ........................ 505/1; 423/592; 423/604; 505/725; 505/780

[58] Field of Search .............. 505/1, 725, 780; 423/604, 592

[56] References Cited

U.S. PATENT DOCUMENTS

| | | | |
|---|---|---|---|
| 5,039,653 | 8/1991 | Jackson | 505/1 |
| 5,043,319 | 8/1991 | Arendt | 423/593 |
| 5,055,445 | 10/1991 | Belt | 505/1 |
| 5,096,879 | 3/1992 | Arendt | 505/1 |

OTHER PUBLICATIONS

Katsui "Crystal Growth of Superconducting Bi-Sr-Ca-Cu-O . . . " *Jap. Jnl Appl. Physics* v. 27(5) May 1988 pp. 844–845.

*Primary Examiner*—Paul Lieberman
*Assistant Examiner*—John Boyd
*Attorney, Agent, or Firm*—Howard J. Greenwald

[57] ABSTRACT

A process for preparing a superconducting, ceramic material with an increased critical current is described. In this process, the materials used to form the superconducting material are mixed with at least one inorganic salt, and the mixture containing the salt is then heat treated. The salt is then leached from the heat-treated mixture.

2 Claims, 1 Drawing Sheet

MOLTEN SALT SYNTHESIS OF ANISOTROPIC POWDERS

FIELD OF THE INVENTION

A process for preparing a superconducting, ceramic material with an increased critical current is described. In this process, the materials used to form the superconducting material are mixed and thereafter blended with at least one inorganic salt. The mixture containing the salt is then heat-treated. The salt is then leached from the heat-treated mixture.

BACKGROUND OF THE INVENTION

The critical current of a superconductive material is the current above which the material is normal and below which the material is superconducting, at a specified temperature and in the absence of external magnetic fields. It is obviously advantageous for a material to have as high a critical current value as possible in order to minimize the amount of external cooling to which it must be subjected.

The prior art has described several attempts to improve the properties of superconductive materials by changing the orientation of the particles comprising them. Thus, at least as early as 1988, an attempt was made to provide a $Ba_2YCu_3O_{7-x}$ material with improved current density properties. In his thesis entitled "Feasibility of Grain-Oriented Processing of $Ba_2Cu_3O_{7-x}$ Ceramic Superconductor by Molten Salt Synthesis" (submitted to the Faculty of Alfred University in May of 1988), Christopher T. Decker disclosed (at page 1 of the thesis) that "Single crystals of $Ba_2YCu_3O_{7-x}$ are difficult to grow in large sizes. Conventional methods of ceramic fabrication ... result in random orientation of the particles resulting in averaged isotropic properties of the final ceramics. The existing anisotropy in the current density of $Ba_2YCu_3O_{7-x}$ warrants a fabrication process of polycrystalline ceramics which would yield net single crystal-like properties in at least one direction with the aim to enhance the current density of the ceramic."

Decker's thesis described an experiment in which reagent grade barium carbonate, yttrium oxide, and copper oxide were combined in molar proportions of $Ba_2YCu_3O_{7-x}$ and this powder mixture was combined with an equal weight of an eutectic mixture of sodium chloride—potassium chloride. This mixture was then milled for 6 hours, dried, and fired at a temperature of from 700 to 900 degrees Centigrade for 2 hours. The fired material was then analyzed by x-ray-diffraction. It was found, on "... comparing the XRD pattern with that of $Ba_2YCu_3O_{7-x}$, ... that $Ba_2YCu_3O_{7-x}$ was not present (see page 5 of the thesis)." At page 11 of his thesis, Decker concluded that "The formation of $Ba_2YCu_3O_{7-x}$ in the presence of molten salts of Na-K, Ba-C and C belonging to chloride and sulfate systems does not appear to be feasible in the temperature range of 400-900 degrees Centigrade. On further stability analysis of the solid-state reacted $Ba_2YCu_3O_{7-x}$ powders in molten salts it was found that the presence of a eutectic liquid accelerates the decomposition of $Ba_2YCu_3O_{7-x}$ due to the accompanying increase in diffusion ...."

A similar conclusion was reached in 1989 in an article entitled "Grain Orientation in high $T_c$ Ceramic Superconductors by Sudhakar Gopalakrishanan and Walter A. Schulze, which was published in "Superconductivity and Applications," edited by H. S. Kwok et al. (Plenum Press, New York, 1989), at pages 411-418. The authors disclosed that it "... was noted from our experiments with the 213 powders, that 213 phase degraded with the salt synthesis. The formation of $Ba_2YCu_3O_{7-x}$ in the presence of molten salts of Na, K and Li does not appear feasible in the temperature range of 400° C.-900° C. (see page 414)."

In the same "Superconductivity and Applications" book, at pages 621-628, an article appeared by D. B. Knorr and C. H. Raeder entitled "Stability of Yttrium Barium Cuprate in Molten Salts." In Table 3 of the article (at page 624), the authors disclosed that the presence of halides, nitrates, sulfates, and mixtures of halides and sulfates all caused some decomposition of the $Ba_2YCu_3O_{7-x}$ phase.

Attempts have also been made to improve the properties of other superconductive materials by contacting the materials from which they are made with inorganic salt. In 1988, Akinori Katsui published an article entitled "Crystal Growth of Superconducting Bi-Sr-Ca-Cu-O Compounds from KCl Solution," Japanese Journal of Applied Physics, Part 2, 1988, 27[5], 1844-5. In the experiment described in this article, appropriate amounts of reagent grade bismuth oxide, strontium carbonate, calcium carbonate, and copper oxide were weighed and mixed to give the composition $BiSrCaCu_2O_y$. This powder mixture was then melted in air at 1,100 degrees Centigrade. Thereafter, from 5-10 grams of this mixture and 130-140 grams of potassium chloride were charged into a platinum crucible, and the mixture thus formed was heated at 850-950 degrees Centigrade for at least several hours.

Katsui reported that Ba-Sr-Ca-Cu-O compound thin plates were found in the product. "However, CuO needle-like crystals were grown from the underside surface of the thin plates." X-ray diffraction analysis of the product revealed a pattern which was "... similar to that of the starting material, except for a difference in the relative intensities of the diffraction peaks."

In his article, Katsui disclosed that his process does not affect the critical current of the superconductive material. He reported that "Zero resistance was observed at about 80K. This value is almost the same as those reported and those of the crystals grown from a $Bi_2O_3$—$SrCO_3$—$CaCO_3$—CuO solution ... This suggests that the properties of the grown crystals were not significantly changed by using KCl as the flux."

It is an object of this invention to provide a process for the preparation of a superconductive material with an increased critical current density.

It is another object of this invention to provide a process for preparing a superconductive material which will not substantially degrade the desired superconductor.

It is yet another object of this invention to provide a tape casting method for the preparation of shaped objects which uses the superconductive material produced by applicants' process.

It is yet another object of this invention to provide a metal-ceramic composite produced by printing a conductive ink onto a material comprised of the superconductive composition of this invention.

It is yet another object of this invention to provide an insulating coating on a superconducting tape comprised of the superconductive material of this invention.

It is yet another object of this invention to provide a process for the preparation of a superconductive material which may be used to prepare relatively large, superconductive ceramic bodies.

SUMMARY OF THE INVENTION

In accordance with this invention, there is provided a process for preparing a superconducting, ceramic material with an increased critical current density. In this process, the materials used to form the superconducting material are mixed. The mixture is then mixed with at least one inorganic salt, and the mixture containing the salt is then heat treated while in a closed container. The salt is then leached from the heat-treated mixture.

BRIEF DESCRIPTION OF THE DRAWING

The present invention will be more fully described by reference to the following detailed description thereof, when read in conjunction with the attached drawing, wherein like reference numerals refer to like elements, and wherein.

DESCRIPTION OF THE PREFERRED EMBODIMENTS

Figure 1:
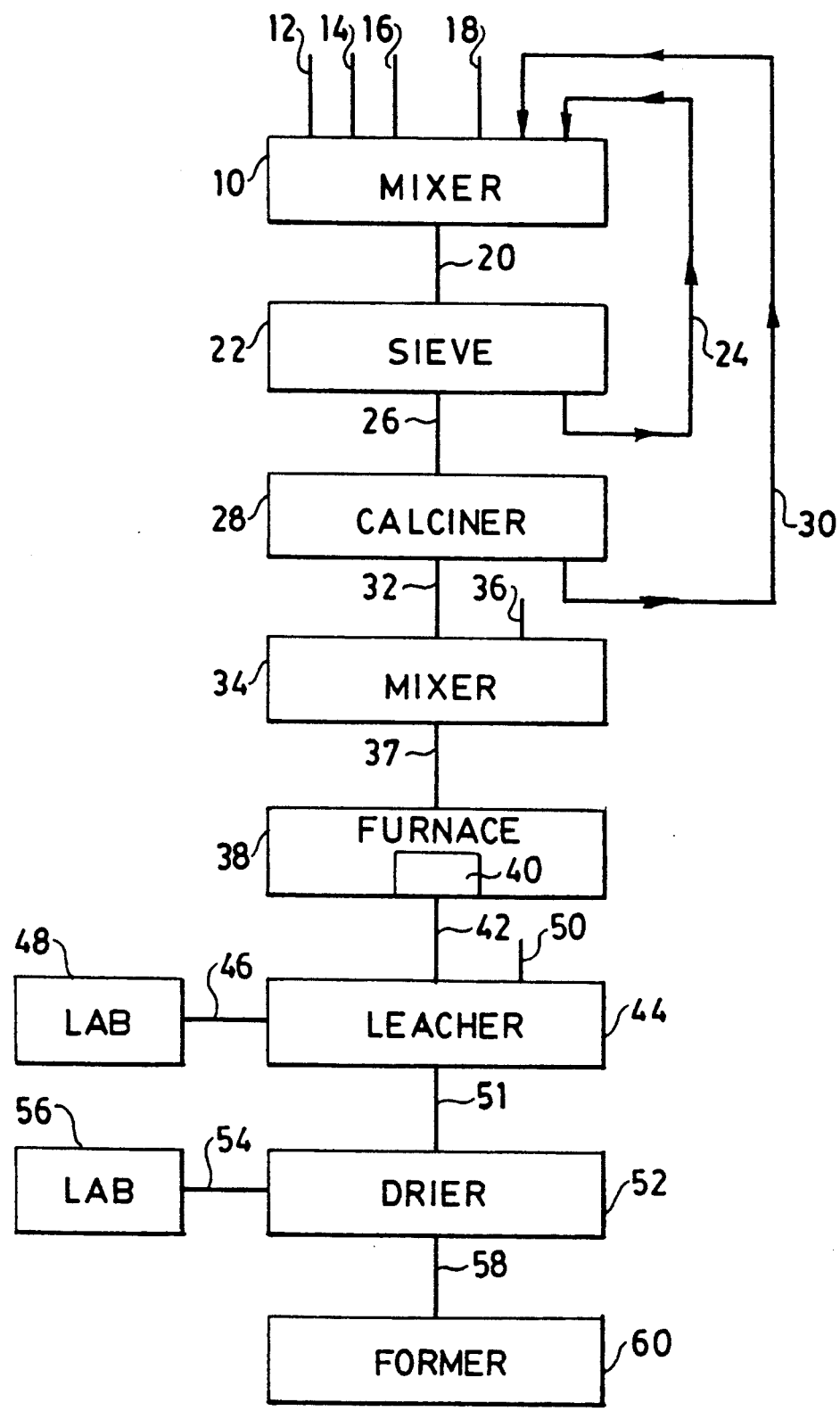
FIG. 1 is a flow diagram illustrating one preferred embodiment of the process of this invention.

The process of this invention is especially suitable for preparing a high Tc ceramic superconductor. These superconductors, and the reagents used to produce them, are known to those skilled in the art. Thus, for example, they are described in an article by A. W. Sleight entitled "Chemistry of High-Temperature Superconductors," Science, Volume 242 (Dec. 16, 1988 at pages 1519-1527). Thus, for example, superconducting materials of the bismuth and thallium systems are disclosed in an article by David P. Matheis and Robert L. Snyder entitled "The Crystal Structures and Powder Diffraction Patterns of the Bismuth and Thallium Ruddlesden-Popper copper Oxide Superconcuctors," Powder Diffraction, Volume 5, No. 1. 8-25, March 1990. The disclosure of each of these references is hereby incorporated by reference into this specification.

In one preferred embodiment, the superconductor produced by the process of this invention is of the formula $(AO)_m M_2Ca_{n-1}Cu_nO_{2n+2}$, wherein (1)A is selected from the group consisting of thallium, bismuth, mixtures of thallium and lead, and mixtures of bismuth and lead, (2)m is from about 1 to about 3, (3)M is selected from the group consisting of barium, strontium, and mixtures thereof, and (4) n is at least 1. These superconductors are well known to those skilled in the art.

In one preferred embodiment, A is bismuth, m is 2, M is strontium, and n is 2. This is the well known 2,2,1,2 bismuth superconductor material.

In another preferred embodiment, A can be a mixture of bismuth and lead, and is represented by the formula $Bi_{2-x}Pb_x$, wherein x is from about 0.0 to 0.5. Thus, the well known 2,2,2,3 bismuth and bismuth—lead superconductors are represented by this formula.

In another preferred embodiment, A is bismuth, m is 2, M is strontium, and n is 1. This is the well known 2,2,0,1 bismuth superconductor.

In another preferred embodiment, A is bismuth, m is 2, M is strontium, and n is 3. The is the well known 2,2,3,4 phase.

In another preferred embodiment, A is thallium, m is 1, M is barium, and n is 1. This is the 1,2,0,1 thallium superconductor. In other embodiments, n may be 2 (the 1,2,1,2 phase), 3 (the 1,2,2,3 phase), or 4 (the 1,2,3,4 phase).

In another preferred embodiment, A is thallium, m is 2, M is barium, and n may be 1 (the 2,2,0,1 phase), or 2 (the 2,2,1,2 phase), 3 (the 2,2,2,3 phase), or 4 (the 2,2,3,4 phase).

Each of these preferred embodiments, and others, are described in the aforementioned article by David P. Matheis and Robert L. Snyder entitled "The Crystal Structures and Powder Diffraction Patterns of the Bismuth and Thallium Ruddlesden-Popper Copper Oxide Superconductors," supra.

In the first step of the process, appropriate amounts of reagent are mixed in stoichiometric proportions suitable to form the bismuth superconductor. Thus, e.g., when one is preparing the 2,1,2,2 superconductor, one may measure out suitable amounts of the bismuth, strontium, calcium, and copper compounds to form the desired material.

Any suitable compounds, such as compounds of the bismuth, strontium, calcium and copper cations, may be used. Thus, by way of illustration and not limitation, one may use the oxides, the carbonates, and/or the nitrates of said cations.

It is preferred that the compounds used be reagent grade and have a purity in excess of 99.9 percent.

Referring to FIG. 1, to mixer 10 may be charged bismuth trioxide (via line 12), strontium carbonate (via line 14), calcium carbonate (via line 16), and copper oxide (via line 18). These powders are then preferably comminuted in mixer 10 until a substantially homogeneous mixture is obtained. In one embodiment, it is preferred to comminute these materials until substantially all of the particles in the mixture are finer than about 50 microns.

The mixture from mixer 10 may then be calcined prior to the time it is contacted with inorganic salt, and this calcining step is preferred. Without wishing to be bound to any particular theory, applicants believe that the, when the mixture contains bismuth, the calcining tends to pre-react all of the precursor materials and thus prevents separation of bismuth during the salt synthesis step. However, although it is preferred, the calcining step is not critical.

Thus, by way of illustration, one can first form a superconductive material (such as the 2,2,1,2 phase) by conventional means, mix this material with the salt, and heat-treat the mixture thus formed to obtain oriented crystallites of the material.

It is preferred, however, to calcine the mixture of reagents used to form the superconductor prior to the time the salt is introduced into the process. This preferred embodiment will be further described below.

Referring again to FIG. 1, the mixture from mixer 10 then may be discharged via line 20 to sieve 22. Oversize material which does not pass through sieve 22 may be recycled via line 24 to mixer 22. Material which passes through sieve 22 is preferably fed via line 26 to calciner 28. The conditions used in calciner 28 will vary depending upon whether A is thallium or bismuth.

When A is bismuth, and/or when the powder mixture passed through sieve 22 contains carbonate compounds, the mixture is subjected to a temperature of at least about 500 degrees Centigrade (and, preferably, from about 500 to about 900 degrees Centigrade) for at least about 4 hours. In one embodiment, the mixture is heated to a temperature of from about 650 to about 750 degrees Centigrade for from about 4 to about 24 hours. This calcining step may be conducted in air, or under oxygen-enriched atmosphere (such as, e.g., oxygen). In this embodiment, in the initial calcining step, it is important not to exceed a calcining temperature of about 900 degrees Fahrenheit.

When A is thallium, and when the powder mixture does not contain carbonate compound(s), then it is preferred to conduct the initial pre-reaction at a temperature of at least 400 degrees Centigrade for at least about 4 hours.

The initial calcining step may be repeated several times in order to achieve the purest possible material. Thus, referring to FIG. 1, calcined material may be recycled via line 30 to mixer 10 wherein it may be ground again, again passed through sieve 22, and then calcined again.

In one preferred embodiment, illustrated in FIG. 1, calcined material from calciner 28 is discharged via line 32 to mixer 34. Into mixer 34, via line 36, is charged at least one inorganic salt with which the calcined material is mixed.

The inorganic salt is charged to mixer 32 in an amount sufficient that the weight/weight ratio of salt/calcined powder is at least about 0.5 and, preferably, is at least about 1,0; in one embodiment, said weight/weight ratio is at least about 2.0 and, even more preferably, at least about 3.0.

The inorganic salt charged via line 36 is preferably substantially anhydrous, containing less than about 1.0 weight percent of water. It is preferred that the inorganic salt also be reagent grade, containing less than about 0.01 weight percent of impurity.

The inorganic salt charged via line 36 will preferably be a salt of a metal selected from the group consisting of lithium, sodium, potassium, rubidium, cesium, francium, beryllium, magnesium, calcium, strontium, barium, thallium, lead, and the like. In general, monovalent and divalent cations may be used.

The anion part of the salt may be a halide (such as a chloride, iodide, bromide, or fluoride), a sulfate, a nitrate, and the like.

By way of illustration and not limitation, one may use salts such as sodium chloride, potassium chloride, mixtures of sodium chloride and potassium chloride, sodium sulfate, potassium sulfate, mixtures of sodium sulfate and potassium sulfate, sodium iodide, potassium iodide, mixtures of sodium iodide and potassium iodide, copper chloride, copper sulfate, strontium chloride, strontium sulfate, calcium chloride, calcium sulfate, sodium fluoride, potassium fluoride, mixtures of the aforementioned, and the like.

In one embodiment, anhydrous sodium chloride is used. In another embodiment, anhydrous potassium chloride is used. In another embodiment, a mixture of sodium chloride and potassium chloride (in a 1:1 molar ratio) is used. In another embodiment, anhydrous sodium sulfate is used. In another embodiment, anhydrous potassium sulfate is used. In another embodiment, a mixture of sodium sulfate and potassium sulfate (in a molar ratio of 1:1) is used.

It is preferred that the melting temperature of the salt (or the salt mixture) used in the process not exceed about 1,400 degrees Centigrade; in one embodiment such temperature is from about 200 to about 1,300 degrees Centigrade. It is also preferred that the salt (or salt mixture) used in the process be water soluble.

It is preferred that the weight loss the batch undergoes during the salt synthesis step not exceed about 10 weight percent and, preferably, not exceed about 1 weight percent.

The inorganic salt is mixed with the calcined powder until a homogeneous mixture is obtained. Thereafter, the mixture of salt and calcined powder is discharged via line 36 to furnace 38, wherein it is heat treated.

It is preferred that the mixture of the salt and the calcined powder be in a closed container 40 while it is being heated in furnace 38 in order to avoid the escape of volatilizable matter. The material in the closed container 40 is preferably heated to a temperature in excess of the melting point of the salt and/or the salt mixture. These melting points may readily be determined by those skilled in the art by reference, e.g., (1) "Handbook of Chemistry and Physics," 63rd Edition (CRC Press, Inc., Boca Raton, Florida, 1982), and/or (2) E. M. Levine et al., "Phase Diagrams for Ceramicists," (American Ceramic Society, Columbus, Ohio, 1969); the disclosures of each of these publications is hereby incorporated by reference into this specification.

The mixture is preferably heated in the closed container 40 to a temperature in excess of the melting point of the salt(s) for at least about 30 minutes and, preferably, for at least about 4 hours. In general, it is preferred to heat the mixture in the closed container to a temperature of at least about 200 degrees Celsius for at least about 30 minutes.

After the mixture has been heated to a temperature sufficient to melt the salt(s), it is cooled to ambient temperature. Thereafter, the cooled material may be discharged via line 42 to leacher 44.

When in leacher 44, the material is contacted with a solvent which will remove the salt(s) from it. In the case of water-soluble salts and water-stable ceramic materials, the solvent is preferably water. Other solvents may also be used, such as alcohols of the formula ROH wherein R is alkyl of from about 1 to about 8 carbon atoms (methanol, ethanol, propanol, butanol, isopropanol), glycerine, acetone, and the like. Suitable solvents for the salt(s) involved may be readily determined by reference to said "Handbook of Chemistry and Physics," supra, A sufficient amount of solvent is used to remove substantially all of the salt(s). Samples of the leached material may periodically be withdrawn via line 46 and analyzed in laboratory 48 to determine their salt contents.

In one embodiment, it is preferred to limit the amount of time the solvent is in contact with the mixture, it being preferred that they be contacted with each other for less than about 2 hours.

The solvent may be at room temperature, and it may be charged to the leacher 44 via line 50. Alternatively, such as when water is used as the solvent, the solvent may be at a temperature of from about 50 to about 80 degrees Celsius.

In one embodiment, illustrated in FIG. 1, solvent is periodically removed from leacher 44 and analyzed in laboratory 46 to determine whether the ceramic material is being dissolved by the solvent. If there is any substantial ceramic material in the solvent, a different solvent should be used.

The leached material, which preferably contains less than about 0.01 weight percent of salt, is then passed via line 50 to drier 52, wherein it is dried to a moisture content of less than about 0.01 weight percent. The dried material is then passed via line 54 to laboratory 56, wherein it is subjected to analysis to determine what phases are present and what shape particles are present. The analytical techniques used in laboratory 56 are well known to those skilled in the art and are described, e.g., in (1)J. I. Goldstein and H. Yakowitz, "Practical Scanning Electron Microscopy" (Plennum Press, New York, 1975), (2)J. I. Goldstein et al., "Scanning Electron Miscroscopy and X-ray Microanalysis" (Plennum Press, New York, 1981), (3)Metals Handbook, Ninth Edition, Volume 10, "Materials Characterization," and (4) B. D. Cullity, "Elements of X-ray Diffraction," Second Edition (Addison Wesley and Sons, 1978). The disclosure of each of these references is hereby incorporated by reference into this specification.

The dried material may be analyzed by powder X-Ray Diffraction in laboratory 56 with conventional X-ray diffractometery apparatus. Thus, by way of illustration, applicants have used two different diffractometers, a Siemens D-500 Diffractometer (Kristalloflex 810, manufactured by the Siemens Company of West Germany), and an automated Noreclo X-ray diffraction unit (manufactured by Phillips Electron Instruments, Mount Vernon, New York) using copper K-alpha radiation, a differential beam graphite monochromator, a step size of 0.02 degrees, and a count time of 1 second.

The temperature of the superconducting transition, Tc, may be evaluated in laboratory 56 in accordance with the procedure described in a paper by M. Pistakis and X. Wang entitled "Automated Superconductor Measurements System," The Review of Scientific Instrumentation, 60(1), pages 135–16, January, 1989. A Keithly current source providing about 1 milliampere to the sample (model number 228A, Keithly Instrument, Inc., Cleveland, Ohio) may be used. A Keithly multimeter (model 195) may be used as a voltmeter to measure the voltage drop across the superconductor sample due to the current. The resistance of the sample at a given temperature is equal to the voltage divided by the current. Another Keithly multimeter (model 196) may be used as a voltmeter for the thermocouple.

The morphology of the dried powder may be evaluated in laboratory 56 by the use of conventional scanning electron microscope apparatus. Thus, by way of illustration, applicants have used two different electron microscopes, one for secondary imaging (an Amray 1810 scanning electron microscope, available from the Amray Company of Bedford, Mass.), and another for E. D. S. analysis (an ETEC autoscan, available from the ETEC Company of Hayward, Ca.).

In another embodiment of the process of this invention, calcined material from calciner 28 is recycled via line 30 to mixer 10, and it is then reground and resieved, and then recalcined. The second calcining step, in this embodiment, is conducted at a temperature of at least about 800 degrees Celsius and, preferably, at least about from about 850 to about 870 degrees Celsius. Thereafter, the recalcined material is processed as described before by passing it through line 32 to mixer 34 and mixing it with the salt(s) therein.

Forming Of The Dried Powder Into A Ceramic Body

The dried powder from drier 52 may be passed via line 58 to former 60, wherein it may be formed into a ceramic body by conventional ceramic techniques. Thus, for example, one may use the techniques described in James S. Reed's "Introduction to the Principles of Ceramic Processing" (John Wiley & Sons, Inc., New York, 1988), the disclosure of which is hereby incorporated by reference into this specification.

Preparation Of A Tape Cast Film

In one preferred embodiment, a film is formed from the dried powder by a tape casting process. As is known to those skilled in the art, tape casting is a process of forming a film of controlled thickness when a slurry flows down an inclined substrate or under a blade onto a supporting surface. The process is generally referred to as continuous tape casting when the blade is stationary and the supporting surface moves, and batch doctor blade casting when the blade moves across the stationary, supporting surface covered with slurry. See, e.g., pages 395–399 of the aforementioned Reed book.

By way of illustration, a sample of dried powder made by the process of this invention may be ball milled in ethanol for a period of about 12 hours to insure homogeneity. Thereafter, the powder may be dried and sized to 325 mesh to insure uniform particle size.

The dried, sieved particles may be mixed with binder and solvent to form a slurry. As is well known to those skilled in the art, any combination of binder and solvent may be used which will provide the necessary rheological properties to the tape to be formed by the tape casting process.

The binders, slurries, and plasticizers which may be used in the tape-casting process are discussed in great detail in (1) an article by J. C. Williams entitled "Doctor-Blade Process" appearing at pages 178–198 of "Treatise on Materials Science and Technology," Volume 9, "Ceramic Fabrication Process," edited by F. Y. Wang (Academic Press, 1976), and (2) an article by R. E. Mistler et al. entitled "Tape Casting of Ceramics," appearing at pages 411–448 of "Ceramic Processing Before Firing," edited by G. Onoda et al. (Wiley Interscience, New York, 1976).

Thus, a commercially available binder which is comprised of toluene solvent, ethanol solvent, and polyvinyl butaryl thermoplastic resin, may be used. This binder, which is identified as "Claddan Product No. B73210," is obtainable from Metoramic Sciences, Inc. of 6510A Yarrow Drive, Carlsbad, California 92009.

In one preferred embodiment, binder additions to the batch are made in the amount of 40–45 percent, by weight.

Toluene, in the amount of 5–7 percent by weight, also may be used to maintain the desired rheological properties. The batch with the binder and solvent may be ball milled for 12 hours with zirconia media and thereafter tape cast on glass using a hand held doctor blade to control the slurry thickness; the blade height may be set at 0.01 inch. A solution of pure lecithin, dissolved at a 1.5 weight percent ratio with 1,1,1 trichloroethylene, may be used as a releasing agent.

Preparation Of Laminated Bodies

Different shapes and sizes of green bodies may be formed by laminating the tapes made by the tape casting process. The lamination process is well known to those skilled in the art and is described, e.g., in the aforementioned J. C. Williams and R. E. Mister et al. papers.

By way of illustration and not limitation, green tapes may be cut into one inch square pieces and laminated in a one inch square die with between from 15 to 20 layers of green tape. The die may then be brought to a stable temperature near the glass transition temperature of the binder through the use of heating plates on a hydraulic press; thus, e.g., one may use a lamination temperature of 60–65 degrees Centigrade, a pressure of about 35 megaPascals, and a time of 2-3 minutes. The one inch laminated monolith thus formed may be trimmed on all edges and diced into individual compacts with dimensions of about 20×4 millimeters.

Preparation Of A Laminate Containing Ceramic And Metal

A laminated body containing alternate layers of superconductive material and metal may be prepared by a process analogous to that used to make ceramic capacitors.

In this process, tape cast superconductive tape may be produced in accordance with the procedure described above. Because the grain-oriented superconducting tape is formed in layers, metal conductor ink may be printed on each layer as in ceramic capacitors, only in a continuous (and not separated) layer. In this way, layers of conductor(metal) and superconductor(ceramic) can be formed together like layers of cloth and paint.

The multi-layered compact thus formed can be cut and formed, or bent into shape (such as, e.g., into curved shapes and/or spiral shapes) and then sintered into a solid object containing both superconductor material and metal.

In one preferred embodiment, a tape consisting essentially of ceramic material may be cast and cut, and metal ink may be printed on the tape in a desired pattern. A separate tape consisting essentially of insulating material may also be cast and cut. Thereafter, a laminate may be prepared by adhering one or more layers of the ceramic/metal tape with one or more layers of the insulating tape, and the laminated material may be cut to shape and/or formed into various shapes.

In yet another embodiment, a tape comprised of superconductive ceramic material, or superconductive ceramic material and metal conductor is prepared. In this embodiment, once the superconductor (or the superconductor and metal conductor strip) has been cut to size, it is coated with an insulating layer, which is applied by conventional spray or dip processing. The insulating material is preferably comprised of compatible oxides from the bismuth/strontium/calcium/copper oxide systems, or the yttrium/barium/copper containing oxide systems.

In one aspect of this embodiment, it is preferred that the insulating tape is cast from the same type of material as the superconductor tape binder system. The laminate produced in this aspect would dry and allow the superconductor strips to be bent so they could touch but not short circuit.

In one embodiment, insulating layers of material are laminated into a stack to separate superconducting layer; and the layers are preferably fired at the same time. Inasmuch as many tape casting systems form tape which, even after lamination, is still flexible, the tape cast material can be bent, rolled, or coiled to complex shapes. Once so shaped, the green body can be heated to burn off the organic binder and heated still higher to sinter it.

In one preferred embodiment of the invention, one may use laminating to produce tape layers that run in the direction of current flow.

The following Examples are presented to illustrate the claimed invention but are not to be deemed limitative thereof. Unless otherwise specified, all parts are by weight, and all temperatures are in degrees Celsius.

EXAMPLE 1

9.124 grams of bismuth trioxide (reagent number B339-500, Fisher 88 Catalog, Fisher Scientific, 711 Forbes Avenue, Pittsburgh, PA.), 1.962 of calcium carbonate (reagent number C64-500, Fisher88 Catalog), 5.798 grams of strontium carbonate (catalog number 20,445-5, Aldrich Chemical Company, Inc., Milwaukee, Wisconsin), and 3.116 grams of copper oxide (catalog number 32,545-7, Aldrich Chemical Company, Inc.) were charged to a laboratory ball mill together with yttria stabilized zirconia (YTZ) media and ethanol. The mixture thus formed was milled for 24 hours.

The milled mixture was then discharged from the ball mill and dried in oven at 85 degrees Celsius until it contained less than 0.01 percent of ethanol.

The dried material was then ground in a mortar and pestle until substantially all of its particles were smaller than 50 microns. It was then passed through a 325 mesh screen.

The material which passed through the screen was then spread over alumina setters and placed into a Lindberg furnace, model 51422, (available from the Linderg/Blue M Divison of General Signal Corporation, Watertown, Wisconsin. The temperature of the furnace was then raised to 700 degrees Celsius at a rate of 150 degrees per hour. Once the furnace had reached the 700 degree Celsius temperature, it was maintained at this temperature for 8.0 hours. During this time, air was flowed over the material being heated at a flow rate of 1.0 liter per minute (or a pressure of from 5–10 p.s.i.).

The furnace was then cooled at a rate of 150 degrees Celsius per hour to ambient temperature. Thereafter, the calcined powder was then removed from the furnace.

The calcined powder was then ground again in a mortar and pestle, passed through the 325 mesh screen, and the material which passed through said screen was again calcined in the Lindberg furnace for the same amount of time and under the same conditions.

2.5 grams of the material which was subjected to the second calcination was then removed from the furnace and charged to a mortar and pestle.

3.296 grams of sodium chloride (reagent number S640-500, Fisher 88 Catalog) and 4.205 grams of potassium chloride (reagent number P330-500, Fisher 88 catalog) were mixed with each other in a 1:1 molar ratio. 7.5 grams of this mixture were also charged to the mortar and pestle, and the salts were then mixed with calcined powder.

The mixture thus formed was placed into a covered magnesia crucible (model number SC30020, obtained from the Ozark Technical Ceramics Company of Webb City, Montana); this container was a high-density, high-purity, cylindrical, flat-bottomed crucible 3.0" in diameter and 2.0 in height. The covered crucible was then placed into the Lindberg furnace, and the temperature of the furnace was then raised to 850 degrees Celsius at a rate of 150 degrees Celsius per hour. Once this temperature had been reached, the temperature was maintained for 4.0 hours. Thereafter, the material was cooled at rate of 150 degrees Celsius per hour.

About 9.8 grams of the cooled mixture were then charged into a beaker, and the material was washed with water at ambient temperature until the filtrate did not contain any more salt. Thereafter, the washed material was dried by heating it to a temperature of 85 degrees Celsius for 2 hours.

The dried material was then subjected to x-ray-diffraction analysis using the Siemens diffractometer described in the specification. This analysis indicated the presence of the 2,2,1,2 phase.

Scanning electron microscopic analysis, using the Amray 1810 SEM described in the specification, SEM analysis (Amray 1810) indicated the presence of platelets which were substantially rectangular, being 30-40 microns in size and about 3-4 microns thick. Many of such platelets, basically anisotropic in nature, could be observed in the micrographs.

EXAMPLE 2

30 grams of the 2,2,1,2 material made in substantial accordance with the procedure of Example 1 were balled milled in ethanol for 24 hours in a ball mill. Thereafter, the comminuted material was dried in an oven by being heated to a temperature of 85 degrees Celsius until it contained less than 0.01 percent of ethanol.

The dried material was then passed through a 325 mesh sieve. Material passing through this sieve was then pressed in a Carver laboratory press, model M (available from Fred S. Carver Inc., Menomonee Falls, Wisconsin) into a rectangular bar 25 millimeters×5 millimeter×5 millimeter. This green body was then placed into the aforementioned Lindberg furnace and sintered at a temperature of 830 degrees Celsius for 6.0 hours while the sample was contacted with air flowing at a rate of about 1.0 liter per minute (a pressure of 5-10 p.s.i.).

The sintered bar was then subjected to X-ray diffraction and Scanning Electron Microscope analysis and resistivity measurement. The X-ray-diffraction analysis showed that the 001 peaks showed increased intensity compared to the calculated pattern.

The scanning electron miscroscopic analysis showed highly platey morphology in the sample.

Direct resistivity measurements on rectangular samples were made by the standards four point resistivity probe method. Copper leads were wound around the samples and air dry silver paint (obtained from GC Electronics, Rockford, Illinois) was used to get a better contact between the wire and the sample. The samples, after electroding, were put into an oven and heated at 80 degrees Celsius for 4 hours to dry the silver paint completely. The silver paint was reapplied to the samples and dried in the oven for another hour. A transport current of 1 milliampere using a Keithly 228 Voltage/-Current Source, a Keithly 617 Programmable Electrometer, and a Keithly 705 Scanner) was used for the measurements. The superconducting transition temperature is the temperature midway between 5 percent and 95 percent of the resistive transition.

Resistivity measurements done on the sample showed an onset of superconductivity at 85 degrees Kelvin and the Tc (critical current) at 80 degrees Kelvin.

COMPARATIVE EXAMPLE 3

39.555 grams of barium carbonate, (reagent number B30-500, Fisher88 Catalog), 23.890 of copper oxide, (catalog 32,545-7, Aldrich Chemical Company, Inc.), and 11.292 grams of yttrium oxide (catalog number 20,516-8, AldrichChemical Company, Inc.) were charged to a laboratory ball mill together with yttria stabilized zirconia (YTZ) media and ethanol. The mixture thus formed was milled for 24 hours. ethanol.

The milled mixture was then discharged from the ball mill and dried in an oven at 85 degrees Celsius until it contained less than 0.01 percent of ethanol.

The dried material was then ground in a mortar and pestle until substantially all of its particles were smaller than 50 microns. It was then passed through a 325 mesh screen.

The material which passed through the screen was then spread over alumina setters and placed into the aforementioned Lindberg furnace. The temperature of the furnace was then raised to 960 degrees Celsius at a rate of 150 degrees Celsius per hour. Once the furnace had reached the 960 degree Celsius temperature, it was maintained at this temperature for 12.0 hours. Thereafter, the material was annealed at 530 Celsius for 6 hours in oxygen flowing at a rate of 1 liter per minute (or a pressure of from 5 to 10 p.s.i.).

The furnace was then cooled at a rate of 150 degrees Celsius per hour to ambient temperature. Thereafter, the calcined powder was removed from the furnace.

The calcined powder was then ground again in a mortar and pestle, passed through the 325 mesh screen, and the material which passed through said screen was again calcined in the furnace using the same conditions as the first calcination.

2.5 grams of the cooled material which had been subjected to the second calcination was then removed form the furnace and charged to a mortar and pestle. To this mortar and pestle also were charged 7.5 grams of the mixture of sodium chloride and potassium chloride described in Example 2. The salt/powder mixture was then mixed in the mortar and pestle.

The mixture thus formed was placed into a covered magnesia crucible described in Example 2. The covered crucible was then placed into the Lindberg furnace, and the temperature of the furnace was then raised to 1,000 degrees Celsius at a rate of 150 degrees Celsius per hour. Once the 1,000 degree Celsius temperature had been reached, it was maintained there for 4 hours. Thereafter, the material was cooled at a rate 150 degrees Celsius.

About 9.8 grams of the cooled mixture was then charged into a beaker and washed with ethanol until the filtrate did not contain any more salt. Thereafter, the washed material was dried by heating it to a temperature of 85 degrees Celsius for 2 hours.

The dried material was then subjected to x-ray-diffraction analysis in accordance with the procedure of Example 2. Analysis indicated the absence of the 1,2,3 phase, illustrating the instability of this phase in the presence of the salt system.

EXAMPLE 4

19.766 grams of barium carbonate (catalog number B30-500, Fisher 88 catalog), 7.955 grams of copper (II) oxide (reagent number 32,545-7, Aldrich Chemical Company, Inc., Milwaukee, Wisconsin), and 22.603 grams of yttrium (III) oxide (reagent number 20,516-8, Aldrich Chemical Company) were charged to a laboratory ball mill together with yttria stabilized zirconia (YTZ) media and ethanol. The mixture thus formed was milled for 12 hours. The milled mixture was then discharged from the ball mill and dried in an oven at 85 degrees Celsius until it contained less than 0.01 percent of ethanol. The dried material was then ground in a mortar and pestle until substantially all of its particles were smaller than 50 microns. The ground material was then sieved through a 325 mesh screen; 2.5 grams of the sieved material were charged to a mortar and pestle. To the mortar and pestle were also charged 7.5 grams of the mixture of sodium chloride and potassium chloride described in Example 2. Thereafter, the salt/powder mixture was mixed in the mortar and pestle.

The mixture thus formed was then placed into the covered magnesia crucible described in Example 2. The covered crucible was then placed into the Lindberg furnace, and the temperature of the furnace was then raised to 1,000 degrees Celsius at a rate of 150 degrees Celsius per hour. Once the 1,000 degree Celsius temperature had been reached, the mixture was maintained at this temperature for 4 hours. Thereafter, the material in the crucible was cooled at a rate of 150 degrees Celsius per hour to ambient temperature. The cooled material was then charged to a beaker and washed with water until the filtrate did not contain any salt. Thereafter, the washed material was dried by heating it to a temperature of 85 degrees Celsius for 2 hours.

The dried material was then subjected to x-ray diffraction analysis, in substantial accordance with the procedure of Example 2. Analysis indicated the presence of the 211 phase.

The dried material was also subjected to scanning electron microscope analysis, in substantial accordance with the procedure of Example 2. Such analysis indicated the presence of platelets.

3.912 grams of the dried "211" material, 5.057 grams of barium carbonate, and 3.393 grams of copper oxide were then charged to a laboratory ball mill. Yttria stabilized zirconia (YTZ) media and ethanol were also charged to the ball mill, and the mixture was milled for 24 hours. Thereafter, the milled mixture was dried and subsequently screened through a 325 mesh screen. 12.362 grams of this mixture, 5.5629 grams of a commercially available binder comprised of polyvinyl butaryl thermoplastic resin ( which is identified as "Claddan Product No. B73210" and is obtainable from Metoramic Sciences, Inc. of 6510A Yarrow Drive, Carlsbad, California 92009), 0.6181 grams of toluene, and 0.1236 grams of polyalkylene glycol plasticizer were charged to the ball mill along with yttria stabilized zirconia media and ball milled for 24 hours.

The ball milled mixture was then cast onto a clean glass sheet sprayed with lecithin, using a hand held doctor blade; the thickness of the green tape formed was maintained at 2 millimeters. After drying the tape in air, the tape was stripped from the glass sheet. The tapes were then cut into 1.0 inch square pieces. About 13 of these square pieces of the green tape were placed in a one-inch square die and laminated at a temperature of 60–65 degrees Celsius and a pressure of 35 megaPascals for about 2 minutes. The one-inch square monolith thus formed was trimmed on all sides and then diced into individual compacts of about 20 m.m.$\times$4 m.m.$\times$4 m.m.

The diced compacts were then placed into the Lindberg furnace and heated to a temperature of 600 degrees Celsius at a rate of 15 degrees Celsius per hour; the binder was allowed to slowly burn out of the compacts. Once the 600 degree Celsius temperature had been reached, the compacts were maintained at this temperature for 1.0 hour. Thereafter, the temperature was raised to 960 degrees Celsius at a rate of 100 degrees Celsius per hour. Thereafter, the sample was heated at 960 degrees Celsius while being contacted with oxygen flowing at a rate of 1.0 liter per minute. Thereafter, the temperature was reduced to 530 degrees Celsius at a rate of 100 degrees Celsius per hour. Thereafter, the samples were heated at 530 degrees Celsius while being contacted with oxygen flowing at a rate of 1.0 liter per minute for 6.0 hours. Thereafter, the furnace was then cooled to ambient temperature.

The sintered compacts were then removed from the furnace. The sintered materials were then analyzed using X-ray diffraction equipment and the scanning electron microscope. Analysis indicated the presence of the 1,2,3 superconducting phase with a moderate degree of orientation. The critical temperature of the samples was 85 degrees Kelvin.

It should be noted from this experiment that the sintered tapes were superconducting. Thus, by the process of this invention, one may form tapes containing the precursor materials for a superconductor and, after sintering, obtain superconductive tapes.

It should also be noted that the density of the tapes produced in this experiment were 85–90 percent of the theoretical density. This factor simplifies the formation of superconducting tapes and allows one to texture the crystallites of the starting materials, thereby producing a better oriented superconducting tape with improved properties.

It should also be noted that the two-stage grain orientation process for the formation of the 123 superconducting tapes avoids the problem of the alleged instability of the 123 superconducting phase in salt solution. The 211 phase is stable in many salt systems, in addition to the one described in the Examples. It is also stable in water, thus enabling the use of water-soluble salts.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims. Thus, by way of illustration, the two-stage grain orientation process may be used with other precursor materials, such as barium perchlorate, barium oxide, barium peroxide, barium nitrate, and the like.

I claim:

1. A process for preparing a superconductive composition, comprising the steps of sequentially:

(a) providing a powder mixture comprised of at least three separate compounds selected form the group consisting of the compounds of yttrium, barium, copper, and mixtures thereof, wherein said powder mixture has a stoichiometry corresponding to $Y_2BaCuO_5$;

(b) mixing inorganic salt with said powder mixture, thereby forming a mixture of inorganic salt and powder, wherein:

(1) said inorganic salt contains less than about 1.0 weight percent of water;

(2) at least 2 parts (by weight) of said inorganic salt is mixed with each part of said powder mixture; and (3) said inorganic salt is a salt of at least one metal selected form the group consisting of lithium, sodium, potassium, rubidium, cesium, francium, magnesium, calcium, strontium, barium, thallium, lead, and mixtures thereof;

(c) charging said mixture of inorganic salt and powder into a closed container;

(d) heating said mixture of inorganic salt and powder, while said mixture is within said closed container, to a temperature in excess of the melting point of said inorganic salt for at least about 30 minutes;

(e) washing said mixture of inorganic salt and powder with solvent until substantially all of said inorganic salt has been leached from said powder, thereby providing a washed mixture; and (f) adding a barium compound and a copper compound to said washed mixture in an amount sufficient to form a mixture with a stoichiometry corresponding to $YBa_2Cu_3O_{7-x}$ and, thereafter, heating said washed mixture.

2. The process as recited in claim 1 wherein after said barium compound and said copper compound have been added to said washed mixture, a binder is added to said washed mixture, and the mixture is thereafter tape cast.

* * * * *